Nov. 16, 1971    A. G. PERKINS    3,619,873
TROWEL FOR PIPE LINING MATERIAL
Filed July 31, 1969
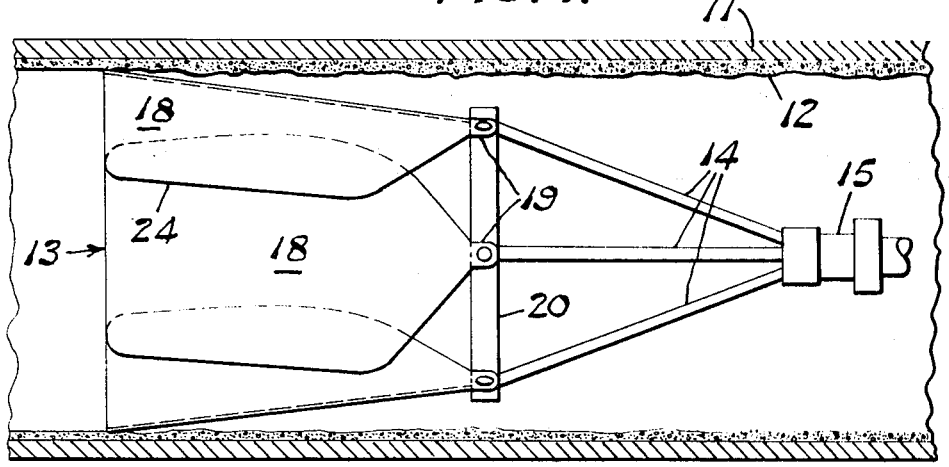
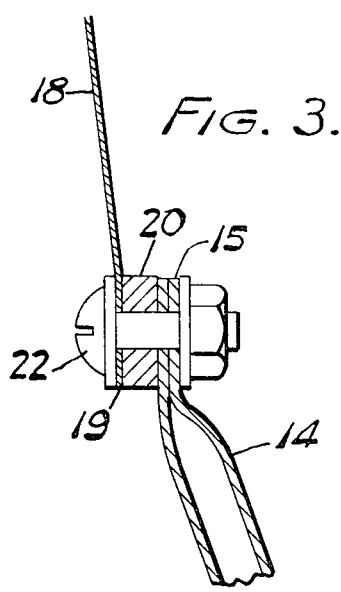
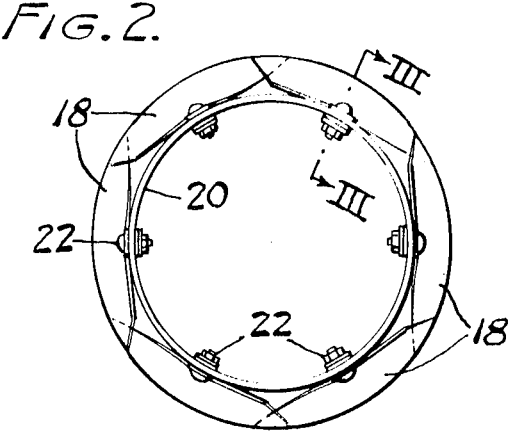
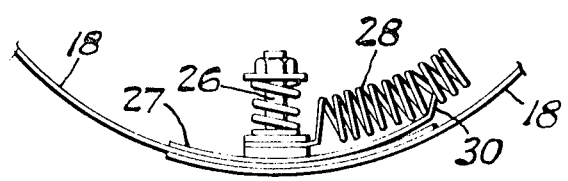
INVENTOR.
ALBERT G. PERKINS
BY
Christel & Bean
ATTORNEYS.

United States Patent Office 3,619,873
Patented Nov. 16, 1971

3,619,873
TROWEL FOR PIPE LINING MATERIAL
Albert G. Perkins, Watkins Glen, N.Y., assignor to
Perkins Pipe Linings, Inc., Watkins Glen, N.Y.
Filed July 31, 1969, Ser. No. 846,380
Int. Cl. B28b 21/18
U.S. Cl. 25—38                          10 Claims

ABSTRACT OF THE DISCLOSURE

A frusto-conical drag trowel for smoothing mortar in an interior generally cylindrical surface. The trowel body comprises laterally overlapping plate members and a mounting member at the small end of the frusto-conical travel body. The adjacent end of each trowel plate is pivoted to the mounting member on an axis extending radially of the trowel body to permit relatively free intersliding movement of adjacent overlapping trowel plates at the large end of the trowel body and such adjacent end of each trowel plate being relatively flexible whereby each of the trowel plates may swing about an axis generally tangent to the mounting member to vary the diameter of the large end of said trowel body. Resilient means are provided within the large end of the trowel body to exert a perimeter-increasing force at said large end for resiliently urging the plate members radially outwardly to urge their trailing ends into yieldable troweling contact with the mortar.

BACKGROUND OF THE INVENTION

This invention relates generally to the art of lining subterranean pipe with a protective layer of mortar and the present invention relates more particularly to troweling devices for effecting a final smoothing operation of such pipe lining material immediately after it has been applied to the interior wall of a pipe, or the like.

Apparatus for applying a lining of mortar or like plastic material to the interior of pipe lines in place in the ground is well known and generally comprises a machine which travels through tha pipe to be lined and distributes a coating of lining material to the interior of the pipe by centrifugal distribution of the material.

Speaking generally, the troweling device of the present invention is of the type generally known in the art as a "drag trowel" which comprises a flexible sheet metal conical frustum having its small end connected to a pipe lining machine to be drawn through the pipe with its large end in engagement with the internal layer of mortar which has been deposited by the pipe lining machine to thereby trowel and smooth such layer of mortar. Example, of trowels of this general type are found in Pat. No. 2,924,-867 to Warren E. Perkins, dated Feb. 16, 1960 and Pat. No. 3,263,296 to John T. Barton, dated Aug. 2, 1966.

Drag trowels of this general type comprise one or more transversely curved sheet metal members which overlap to form an open-ended conical frustum. The plates are generally connected to a support at the small end of the conical frustum and are provided with internal resilient means which tend to expand the large end of the frustum into troweling engagement with the mortar layer at the interior of the pipe. The small ends of trowels of this type may have a relatively fixed diameter but the large ends which perform the actual troweling function require special qualities of resilience to provide for diametral expansion and contraction as the trowel moves through the pipe.

Drag trowels of the type exemplified in the above patents and as generally known in this art have not provided adequate means for equalizing the resilient expanding pressure of the spring means or the like provided for urging the trowel plates resiliently outwardly at the large end of the trowel assembly. For instance, in Perkins Pat. 2,924,867 a series of trowel plates are pivoted to each other at the small end of the conical frustum, as shown paticularly in the embodiment illustrated in FIGS. 8 and 9 of that patent .

However, relative pivotal movement of the trowel plates against each other about an axis perpendicular to the axis of the conical frustum is substantially prevented by the fact that each individual trowel plate has two connections 34' to a supporting ring 32'. The connections 34' permit pivoting of the trowel plates outwardly about the ring 32' but effectively prevent relative pivotal movement of the trowel plates about the pivotal connections 30' between the several trowel plates. Accordingly, the several spring devices at the inside of the large end of the trowel which tend to hold the trowel plates apart and thus tend to urge the large end of the trowel to an increasing diameter act substantially independently.

Substantially the same limitation is present in Barton Pat. No. 3,263,296 wherein the individual trowel plates are free to swing outwardly by flexure of their flat inner end portions 21. However, despite the self-equalizing nature of the internal expansion spring 34 of this patent, each individual trowel plate is limited to inward and outward movement and lateral intersliding movement of the large ends of the trowel plates takes place only as an incident to such inward and outward swinging movement.

SUMMARY OF THE INVENTION

In the frusto-conical drag trowel of the present invention the individual trowel plates which overlap to form the generally frusto-conical trowel body are each connected to a supporting ring at the small end of the trowel structure by a single pivot whose axis comprises a radius of such supporting ring. Thus the trowel plates at the large end are provided with means whereby the several overlapping plates may have unequal degrees of relative intersliding movement whereby the spring devices acting across the several overlaps will automatically equalize with respect to each other due to the ability to interslide unequally at the several overlapping joints with the net result that the several spring devices will tend to equalize with respect to each other to exert substantially uniform resilient expansive forces across the everal overlaps at the large end of the trowel.

This produces a much more satisfactory and more uniform troweling pressure about the circumference of the trowel and is very effective in the many instances when the trowel is acting against a mortor surface which is not truly circular. Such conditions routinely present themselves, as when the trowel is passing through a curving pipe section as a result of which the surface being troweled is slightly oval in cross section and also when obstructions of various kinds are encountered along the interior of the pipe being lined.

BRIEF DECRIPTION OF THE DRAWING

FIG. 1 is a longitudinal cross sectional view of a pipe wherein one form of the trowel of the present invention is acting against a roughly applied internal mortar coating to trowel and smooth the same;

FIG. 2 is an end elevational view of the trowel assembly of FIG. 1 viewed from the right-hand side, that is from the leading end of the trowel assembly;

FIG. 3 is a fragmentary cross sectional view taken generally on the line III—III of FIG. 2; and FIG. 4 is a fragmentary end elevational view of the trowel of FIG. 1 taken from the left-hand or trailing end thereof, as viewed in FIG. 1.

DESCRIPTION OF THE PREFERRED EMBODIMENT

The apparatus for applying the coating material to the interior of the pipe as a plastic mix in the form of mortar or the like is well known in the present art and the details thereof shall be referred to only to the extent required to properly orient the troweling means relative thereto, the troweling means per se comprising the particular subject matter of the present invention. A suitable lining machine for present purposes is illustrated and described in United States Pat. 2,758,352. Referring to FIG. 1, the numeral 10 designates a subterranean pipe and a rough layer of mortar to be troweled is indicated at 12.

The embodiment of the frusto-conical troweling element of the present invention is designated generally by the numeral 13 in FIG. 1 and is connected to the pipe lining machine at the leading end of the trowel by a plurality of rods 14 which radiate rearwardly from a swivel connection 15 at the rear of the pipe lining machine.

In the present instance the troweling element 13 comprises six overlapping trowel plates 18, each of which is arcuate in cross section throughout most of its length but has a flat relatively narrow tab portion 19 at its smaller leading end. The radius of the transversely arcuate portion of each plate 18 varies progressively so each trowel plate 18 comprises a portion of the surface of a cone.

The numeral 20 designates a mounting member which, in the present instance, comprises a rigid ring to the exteror of which the tab portions 19 of the trowel plates 18 are pivotally attached. As shown in FIG. 3, the rods 14 by means of which the trowel is drawn through the pipe, may comprise tubular members flattened at their rear ends, as shown at 15 in FIG. 3, and a bolt and nut connection 22 attaches each traction rod 14 to ring 20 and pivotally connects each of the tab portions 19 of the trowel plates 18 to ring 20.

Since the tab portions 19 are relatively narrow and the material of the trowel plates is relatively flexible, the trowel plates are in effect hinged to ring 20 for inward and outward swinging movement about axes extending substantially tangent to the exterior periphery of ring 20, thus providing means whereby the large end of the trowel body may increase and decrease readily in effective diameter to adjust to troweling conditions within the pipe.

When the trowel plates are in an unstressed condition the plates are flexed outwardly to maximum diameter by spring means within the large end of the trowel, as will presently be described. The position of the trowel plates illustrated in FIG. 1 is the combined result of inward pressure of mortar against the outer trailing ends of the trowel plates and the opposing resilient outward force of the spring means within the large end of the trowel. Attached as described above, the six trowel plates overlap as illustrated to form a conical frustum. To insure the desired trailing action of the exterior surfaces of the trailing portions of the trowel plates 18, the longitudinal edges of the outer overlapping portions of the trowel plates are cut to form trailing angles such as indicated at 24 in FIG. 1.

The resilient means for urging the trailing portions of the trowel plates 18 outwardly while permitting them to deflect radially inwardly under pressure of mortar thereagainst and under pressure of various obstructions which may be encountered, will now be described.

The resilient expansion means is preferably of a type shown in Perkins Pat. No. 3,188,710, dated June 15, 1965. As shown in FIG. 4, the outer overlapping portion of each trowel plate 18 has a stud 26 welded or brazed thereto which projects radially inwardly through a circumferentially extending slot in the inner underlying portion of the adjacent trowel plate and through a similar slot in a clip 27 which is attached to the interior of such inner underlapping portion, as in the aforesaid Pat. 3,188,710.

An extenson coil spring designated 28 in FIG. 4 has one end connected to the outer overlapping trowel portion by way of stud 26, and has it other end connected to the inner underlapping portion by connection with a hook formation 30 at one end of clip 27, likewise as in the aforesaid Pat. 3,188,710.

From the foregoing it will be seen that each of the several plates 18 of the frusto-conical trowel body is relatively flexible at its base or root portion comprising tab portion 19 whereby the plates may be securely attached to mounting member 20 and still possess the necessary freedom to expand and contract during troweling operations under the opposing pressures of the expanding spring means, on the one hand, and the external force exerted by the mortar surface or extraneous obstructions, on the other hand.

Furthermore, the freedom of each trowel plate to pivot about the bolt connection 22, whereby each plate may pivot generally in an arcuate plane comprising the surface of the conical trowel body, permits the several plates to adjust pivotally, whereby the expanding resilient forces imparted by the several springs 28 will inherently equalize themselves. The freedom of the several trowel plates 18 to pivotally adjust in this manner is limited only by the maximum intersliding movement permitted by the studs 26 in the circumferentially extending slots in clips 27 and the underlapping trowel plate portions. As a result of the foregoing arrangement the expanding force of each of the series of springs 28 will tend to equalize with respect to the expanding force of the other springs of the series. In effect, each trowel plate is pivotally connected to mounting means 20 about two axes, one extending radially of the support ring or mounting means 20, and the other generally tangent thereto along a line generally coincident with the trailing face of support ring 20, as viewed in FIG. 1.

In order to maintain the trowel plates 18 in the normal trailing positions illustrated in FIG. 1, the tab portions 19 thereof are preferably located along longitudinal center lines which lie approximately midway of the exposed troweling portions of the trowel plates when the trowel is in normal troweling operation.

I claim:

1. Trowel means for smoothing a layer of plastic lining material in an interior generally cylindrical surface, said trowel means comprising a plurality of longitudinally extending laterally overlapping plate members which combine to form a generally frusto-conical trowel body having a small leading end and a larger trailing end, the body portions of said plate members being arcuate in transverse cross section and of a progressively increasing radius toward the large end of the trowel body to form said frusto-conical body, a mounting member at the small end of said trowel body, single pivot means attaching the adjacent end of each trowel plate to said mounting member for independent pivotal movement of said plate about an axis extending radially with respect to said trowel body to permit relatively free intersliding movement of adjacent overlapping trowel plate portions at the large end of said trowel body, said adjacent end of each trowel plate being relatively flexible whereby each of said trowel plates may swing about an axis generally tangent to said mounting member to vary the diameter of the large end of said trowel body to exert a perimeter-increasing force at said larger end for resiliently urging the plate members radially outwardly to urge said larger end into yieldable troweling contact with said lining material.

2. Trowel means as in claim 1 wherein said mounting member is generally circular and coaxial with said frusto-conical trowel body.

3. Trowel means as in claim 1 wherein each plate member has a tab portion of reduced width at its leading end for said pivotal attachment to said mounting member.

4. Trowel means as in claim 3 wherein said tab portion is substantially medially of the width of the exposed troweling portion of such plate member considered circumferentially.

5. Trowel means as in claim 1 wherein said resilient means comprises spring means acting across the overlap of each adjacent pair of trowel plates to urge said plates slidably in a diameter-increasing direction.

6. Trowel means as in claim 1 wherein said resilient means comprises spring means connected respectively to the overlapping and underlapping trowel plate of each pair of overlapping trowel plates adjacent to the large end of the trowel body and acting to urge said plates slidably in a diameter-increasing direction.

7. Trowel means as in claim 3 wherein said resilient means comprises a spring acting across the overlap of each adjacent pair of trowel plates to urge said plates slidably in a diameter-increasing direction.

8. Trowel means as in claim 4 wherein said resilient means comprises a spring acting across the overlap of each adjacent pair of trowel plates to urge said plates slidably in a diameter-increasing direction.

9. Trowel means as in claim 3 wherein said resilient means comprises spring means connected respectively to the overlapping and underlapping trowel plate of each pair of overlapping trowel plates adjacent to the large end of the trowel body and acting to urge said plates slidably in a diameter-increasing direction.

10. Trowel means as in claim 4 wherein said resilient means comprises spring means connected respectively to the overlapping and underlapping trowel plate of each pair of overlapping trowel plates adjacent to the large end of the trowel body and acting to urge said plates slidably in a diameter-increasing direction.

References Cited

UNITED STATES PATENTS

| | | | |
|---|---|---|---|
| 3,188,710 | 6/1965 | Perkins | 25—38 |
| 3,257,697 | 6/1966 | Ruegsegger | 25—38 |
| 3,263,296 | 8/1966 | Barton | 25—38 |

J. SPENCER OVERHOLSER, Examiner

B. D. TOBOR, Assistant Examiner

U.S. Cl. X.R.

25—104.5